J. H. WILSON.
COOKING UTENSIL.
APPLICATION FILED SEPT. 24, 1912.
1,072,892.
Patented Sept. 9, 1913.
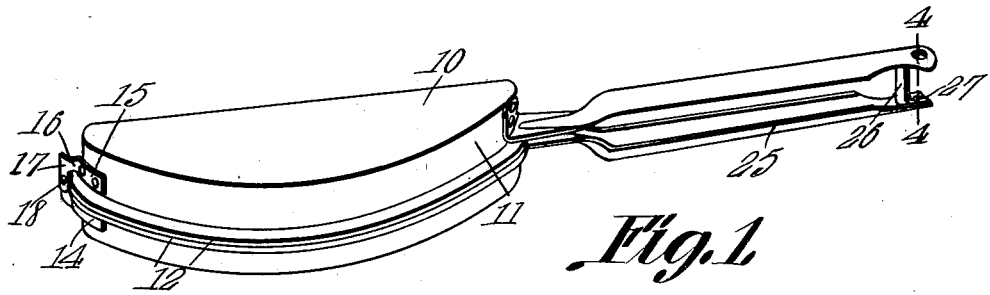
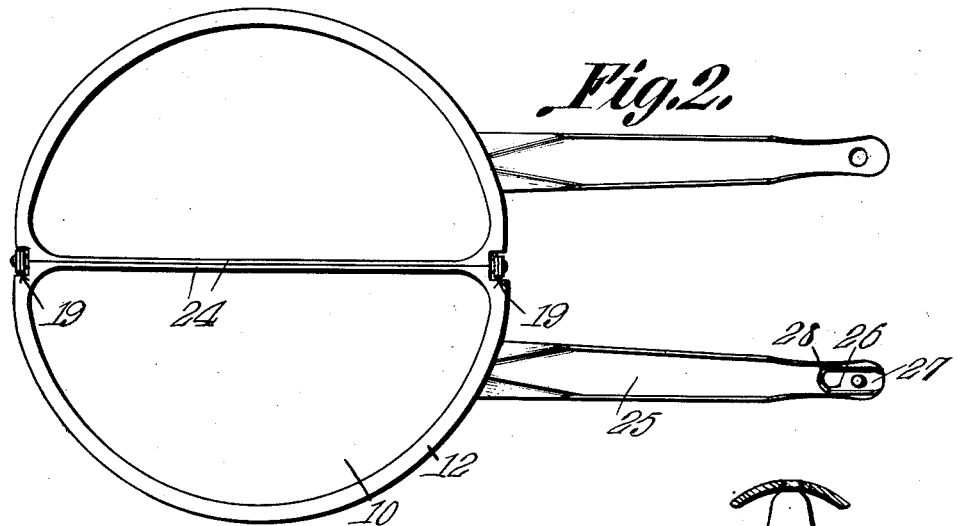
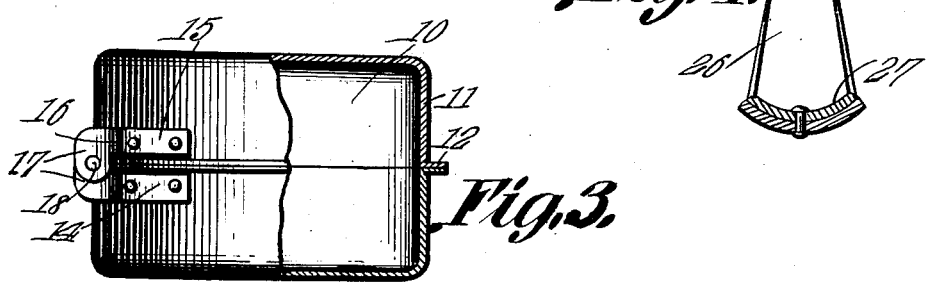
Witnesses
J. R. Tomlin
R. F. Peacock
John H. Wilson,
Inventor
by C. A. Snow & Co.
Attorneys

UNITED STATES PATENT OFFICE.

JOHN H. WILSON, OF NEW KENSINGTON, PENNSYLVANIA.

COOKING UTENSIL.

1,072,892.  Specification of Letters Patent.  Patented Sept. 9, 1913.

Application filed September 24, 1912. Serial No. 722,123.

*To all whom it may concern:*

Be it known that I, JOHN H. WILSON, a citizen of the United States, residing at New Kensington, in the county of Westmoreland and State of Pennsylvania, have invented certain new and useful Improvements in Cooking Utensils, of which the following is a specification.

This invention relates to an improvement in cooking utensils.

The primary object of the invention is to provide a skillet or frying pan formed of two receptacles hingedly connected and equipped with means whereby the meeting edges of the flanges of the two receptacles, may be maintained flush regardless of the pressure exerted on the handles.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings; Figure 1 is a perspective view showing the skillets closed. Fig. 2 is a plan view showing the same open. Fig. 3 is an end elevation partly in section. Fig. 4 is a section taken on the line 4—4 of Fig. 1 showing the arrangement of the member which maintains the handles in spaced parallel relation.

In the drawings, 10 designates one of the sections of the frying pan, said section being substantially semi-circular in plan, and being formed with the wall 11 which terminates in a flange 12, the flange on the curved wall of the receptacle, being more extensive than the flange on the straight wall. The members 14 and 15 which constitute the hinge are secured to the curved wall of the receptacle, adjacent the straight edge, the same being bent outwardly at 16, the offset portions 17 being perforated to receive the pin 18, the receptacles being hingedly connected at both of their ends. The more extensive flanges 12 are cut away at 19 to accommodate the apertured extension 17 of the hinge members when the device is opened as shown in Fig. 2, this construction allowing said members to open until their straight walls 24 are substantially parallel. Each of the sections of the receptacle is provided with a handle 25, these handles being brought together as shown in Fig. 1 to close the skillet. In skillets of this character it has been found that when the handles are brought together and pressure exerted on their outer ends that the same will have a tendency to spring the flanges 12 apart making an opening and allowing the contents to spill. In order to avoid exertion of pressure on the flanges and in order to maintain the sections of the receptacle in such position with respect to one another, that their flanges rest evenly one upon the other, one of the handle members 25 is provided with a stop 26. This stop consists of a plate 27 which is riveted or otherwise secured to the handle member, said plate being formed with the tapered offset portion 28 which is of such a length that when the handle members are brought together the same will contact with the handles to space the same to maintain the flanges 12 in proper alinement with each other.

The many advantages of a construction of this character will be clearly apparent as it will be noted that the same provides means for effectually holding the members in proper spaced relation, preventing the hinges from becoming distorted, through excessive pressure on the handles and assuring a perfectly closed receptacle.

It is to be noted that the hinges 14—15 are located upon the outer faces of the sections of the pan and are independent of the straight walls 24. Consequently, when one section 10 is inverted upon the other section, the hinges 14—15 do not catch the contents of the pan. Further, owing to the location of the hinges 14—15 there are no openings through the walls of the sections 10, through which the contents of the pan may drip when one section is inverted upon the other. Attention is directed to the fact that the flanges 12 are cut away as at 19 to accommodate the hinge members 14—15. As a consequence, the hinge members 14—15 are permitted to lie close to the outer surface of the pan, and may be made comparatively short. Because the hinge members 14—15 may be made short, they are not likely to spring when one section 10 is inverted on the other section and because the hinges are not likely to spring, a separation of the flanges 10, when the handles 25 are grasped simultaneously, is not likely to occur, reference being had particularly to Fig. 1. The hinge which is located immediately between the handles 25 may be denominated the inner hinge, the other hinge being designated as the outer hinge. It is mechanically impossible to construct the hinges so that there will be no lost motion, and a lost motion invariably occurs after a protracted period of use. Owing to this lost motion, the handles 25 and the sections 10, when the parts are positioned as shown in Fig. 1, tend to act as levers of the first order, the inner hinge constituting a fulcrum. As a consequence, when the handles 25 are grasped simultaneously, there is a tendency for the flanges 12 to separate slightly adjacent their outer ends and the flanges 12 do not, therefore effect a perfect closure along the curved edges of the sections of the pan. It is to remedy this difficulty that the stop 26 is provided, it being obvious that when the handles 25 are pressed together, the stop 26 prevents the handles and the constituent sections of the pan from acting as levers of the first order, as hereinbefore described. When the handles 25 are grasped simultaneously the flanges 12 throughout their entire extent will be pressed firmly together, owing to the presence of the stop 26.

What is claimed is:

A skillet comprising a pair of receptacles each having a straight edge and having a curved edge surrounded by a marginal flange; inner and outer hinges connecting the receptacles and located at the ends of the straight edges, the hinges being located outside of the pan to avoid an accumulation of the contents of the pan upon the hinges when one receptacle is inverted upon the other, the flanges having openings receiving the hinges, thereby permitting the hinges to be located close to the receptacle, thus effecting a shortening of the hinges and lessening the tendency of the hinges to spring and effect a spacing of the flanges; handles secured to the receptacles adjacent the inner hinge and offset from the said hinge; one handle being provided adjacent its free end with a stop adapted to engage the other handle, the stop constituting means for preventing the handles and the receptacles from acting as levers of the first order, with the inner hinge as a fulcrum, and thus spacing portions of the flanges, when the receptacles are superposed and when the handles are grasped simultaneously.

In testimony whereof I affix my signature in presence of two witnesses.

JOHN H. WILSON.

Witnesses:
 HARRY C. WALLEY,
 REBECCA A. WALLEY.